US006771598B1

(12) United States Patent
Andrews

(10) Patent No.: US 6,771,598 B1
(45) Date of Patent: Aug. 3, 2004

(54) METHOD OF ADMISSION CONTROL FOR PACKETIZED COMMUNICATION NETWORKS

(75) Inventor: Daniel Matthew Andrews, New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/533,725

(22) Filed: Mar. 23, 2000

(51) Int. Cl.[7] .......................... H04L 12/26; H04L 12/28
(52) U.S. Cl. .................. 370/230; 370/395.2; 370/395.4
(58) Field of Search ................................ 370/230, 233, 370/232, 230.1, 395.4, 395.2, 395.21, 395.41

(56) References Cited

U.S. PATENT DOCUMENTS

| | | | | |
|---|---|---|---|---|
| 5,357,507 A | * | 10/1994 | Hughes et al. | 370/234 |
| 5,838,663 A | * | 11/1998 | Elwalid et al. | 370/233 |
| 5,978,356 A | * | 11/1999 | Elwalid et al. | 370/230 |
| 6,028,840 A | * | 2/2000 | Worster | 370/230 |
| 6,442,138 B1 | * | 8/2002 | Yin et al. | 370/232 |

OTHER PUBLICATIONS

Elwalid, A. et al., "Design of Generalized Processor Sharing Schedulers which Statistically Multiplex Heterogeneous QoS Classes," *Proc. IEEE INFOCOM '99* pp. 1220–1230 (1999).

Kumaran, K. et al., "Novel Techniques for the Design and Control of Generalized Processor Sharing Schedulers for Multiple QoS Classes," *Proc. IEEE INFOCOM '00* (Mar. 2000).

Liebeherr, J. et al., "Exact Admission Control for Networks with a Bounded Delay Service," *IEEE Transactions on Networking 4* (1996).

Georgiadis, L. et al., "Optimal Multiplexing on a Single Link: Delay and Buffer Requirements," *IEEE Transactions on Information Theory 43*.

Andrews, M. et al., "Dynamic Packet Routing with Per-Packet Delay Guarantees of O(distance+1/session rate)" *Proceedings of the 38th Annual Symposium on Foundations of Computer Science*, pp. 294–302 (1997).

Andrews, M. et al., "Minimizing End–to–End Delay in High–Speed Networks with a Simple Coordinated Schedule" *Proceedings of IEEE INFOCOM '99*, pp. 380–388 (1999).

Andrews, M. et al., "Packet Routing with Arbitrary WEnd-to-End Delay Requirements" *Proceedings of the 31st Annual ACM Symposium on Theory of Computing*, pp. 557–565 (1999).

(List continued on next page.)

Primary Examiner—Hassan Kizou
Assistant Examiner—Timothy Lee
(74) Attorney, Agent, or Firm—Martin I. Finston

(57) ABSTRACT

A method is disclosed for determining the admissibility of an offered session of traffic of a specified class to a server in a packetized communication network. Each class c has a peak traffic rate r(c). The server has a total processing rate C. Admitted packets are scheduled according to an EDF scheduling discipline. The method for determining admissibility comprises defining an operating point for the server. The operating point represents the number of sessions $N_c$ of each respective class currently offered or currently being served. The method further comprises determining whether the defined operating point falls within a set of operating points that together define an admissible region. The admissible region consists of operating points for which the probability of violating a delay bound for any packet is below a threshold. The determination of the admissible region involves principles of statistical multiplexing.

10 Claims, 5 Drawing Sheets

OTHER PUBLICATIONS

Chiussi, F. et al., "Achieving High Utilization in Guaranteed Services Networks Using Early–Deadline–First Scheduling," *Proceedings of the 6th IEEE/IFIP International Workshop on Quality of Service* pp. 209–217 (1998).

Elwalid, A. et al., "Design of Generalized Processor sharing Schedulers Which Statistically Multiplex Heterogeneous QoS Classes," *Proceedings of IEEE INFOCOM '99,* pp. 1220–1230 (1999).

Elwalid, A. et al., "A New Approach for Allocating Buffers and Bandwidth to Heterogeneous, Regulated Traffic in an ATM Node," *IEEE Journal on Selected Areas in Communications, 13*(6): 1115–1127 (1995).

Ferrari, D. et al., "A Scheme for Real–Time Channel Establishment in Wide–Area Networks," *IEEE Journal on Selected Areas in Communications,* 8(3): 368–379 (1990).

Firoiu, V. et al., "Efficient admission control for EDF schedulers," *Proceedings of IEEE INFOCOM '97,* pp. 310–317 (1997).

Georgiadis, L. et al., "Optimal Multiplexing on a Single Link: Delay and Buffer Requirements," *IEEE Transactions on Information Theory,* 43(5):1518–1535 (1997).

Georgiadis, L. et al., "Efficient network QoS provisioning based on per node traffic shaping," *Proceedings of IEEE INFOCOM '96* pp. 102–110 (1996).

Liebeherr. J. et al., "Exact Admission Control for Networks with a Bounded Delay Service," *IEEE/ACM Transactions on Networking* 4(6):885–901 (1996).

Liebeherr, J. et al., "Workconserving vs. non–workconserving Packet Scheduling: An Issue Revisited", *Proceedings of the 7th IEEE/IFIP International Workshop on Quality of Service* (1999).

Sivaraman, V. et al., "Statistical Analysis of Delay Bound Violations at an Earliest Deadline First (EDF) Scheduler," *Performance '99* (1999).

Verma, D.C. et al., "Delay Jitter Control for Real–Time Communication in a Packet Switching Network," *Proceedings of Tricomm '91* (1991).

Wrege, D. et al., "A Near–Optimal Packet Scheduler for QoS Networks," *Proceedings of IEEE INFOCOM '97* (1997).

* cited by examiner

METHOD OF ADMISSION CONTROL FOR PACKETIZED COMMUNICATION NETWORKS

FIELD OF THE INVENTION

This invention relates to methods of Connection Admission Control (CAC) in packetized communication networks. More particularly, the invention relates to CAC in networks that apply the Earliest-Deadline-First (EDF) scheduling discipline.

ART BACKGROUND

FIG. 1 schematically depicts a simplified packet network in which users 10.1–10.3, 12.1–12.4, and 15.1–15.3 can intercommunicate via interconnected servers or switches 20.1–20.5. The network has been simplified for illustrative purposes; real-life networks will typically have many more users and servers than shown in the figure. If, e.g., user 10.1 wishes to reach user 15.1 through the network, user 10.1 will issue a request to its associated server 20.1 to set-up a session. A session is a collection of related packets having a fixed path from a source to a destination, and having a specified description of properties such as packet-injection rate, burst size, and maximum packet length. The fixed path will typically be determined when the user makes the set-up request, and may be determined by the first server 20.1. The set-up request is passed to every server along the path. Each server engages a function, referred to as Connection Admission Control (CAC), which determines whether to admit the requested session. If the session is admitted by every server along the path, the set-up request is honored and the packets can be sent.

Each server e has a finite processing rate $C_e$. That is, each server e can relay its queued packets to the next server (or from the last server to the destination user) at a rate no greater than $C_e$ bits per unit time. Because this processing rate is finite, some bits will generally accrue delay at some or all of the servers along the path.

Excessive packet delay may be intolerable to customers of various kinds of network traffic, such as voice traffic, which is notoriously delay-sensitive. It is of increasing interest to specify, inter alia, the delay performance demanded of a network under the rubric of Quality of Service (QoS) requirements. In this regard, a typical QoS requirement is that packet delay in a specified class of service must always be less than a specified threshold, or (if it is a probabilistic requirement) that there must be no more than a specified probability that packet delay will exceed the threshold.

In networks subject to QoS requirements, the CAC function will consider whether the specified limits on delay can be met. If it is determined that the specified limits cannot be met, the offered session will be denied admission. Whether these limits can be met will depend, in part, on how the resources of the server are allocated among sessions. (It should be noted that the term "session" as used herein is synonymous with the term "connection" in the sense that would apply in the present context.) Such allocations are governed by so-called scheduling disciplines. Two prominent scheduling disciplines are those known as Generalized Processor Sharing (GPS) and Earliest-Deadline-First (EDF). Under GPS, the server partitions its resources among connections according to specified weights. Under EDF, the server assigns a deadline $d_p$ to each incoming packet p upon arrival, and then always serves the packet with the earliest deadline. For a given network state, each scheduling discipline may lead to a different decision regarding the admissibility of a newly offered session.

Most approaches to the delay-based admission decision have relied on worst-case assumptions, e.g., that all sessions will simultaneously send a burst of packets at the peak arrival rate. Approaches that rely on such assumptions are disadvantageous because they will deny admission to an excessive number of calls. Some improvement in the amount of carried traffic has been achieved, at least exploratorily, through the approach known as statistical multiplexing, which takes advantage of the statistical nature of the offered traffic in order to accept more offered sessions while adhering to probabilistic delay bounds. Discussions of statistical multiplexing as applied to GPS scheduling can be found, for example, in A. Elwalid et al., "Design of generalized processor sharing schedulers which statistically multiplex heterogeneous QoS classes," *Proc. IEEE INFOCOM* '99 (March 1999) 1220–1230, and in K. Kumaran et al., "Novel techniques for the design and control of Generalized Processor Sharing schedulers for multiple QoS classes," submitted for publication in *Proc. IEEE INFOCOM* '00, (March 2000).

Until now, however, there has been no application of statistical multiplexing to delay-based admission decisions under the EDF scheduling discipline.

SUMMARY OF THE INVENTION

I have developed a new method for estimating the probability of violating a packet-delay bound under the EDF scheduling discipline. My method takes into account the statistical properties of offered network traffic, and thus comes under the scope of statistical multiplexing. My method will make it possible for a server employing EDF to satisfy probabilistic QoS requirements while admitting many more offered sessions than possible using the older CAC methods that rely on worst-case assumptions about the offered traffic.

Thus, in one aspect, my invention involves a method for determining the admissibility of an offered session of traffic of a specified class to a server in a packetized communication network. Each class c has a peak traffic rate r(c). The server has a total processing rate C. Admitted packets are scheduled according to an EDF scheduling discipline. The method for determining admissibility comprises defining an operating point for the server. The operating point represents the number of sessions $N_c$ of each respective class currently offered or currently being served. The method further comprises determining whether the defined operating point falls within a set of operating points that together define an admissible region. The admissible region consists of operating points for which the probability of violating a delay bound for any packet is below a threshold. In contrast to methods of the prior art, the admissible region includes at least one point that would lead to violations of the packet-delay bound if all sessions were to simultaneously start sending a burst of packets at the peak arrival rate.

DETAILED DESCRIPTION

Figure 1:
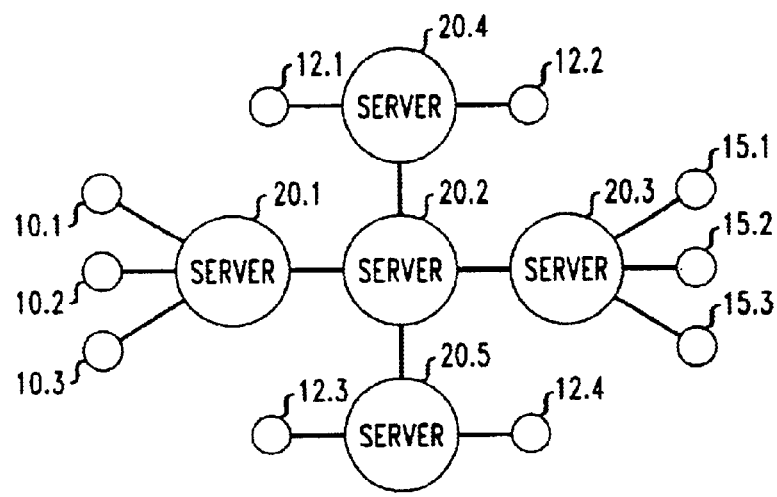
FIG. 1 is a simplified schematic diagram of an illustrative packet network in which users intercommunicate via interconnected servers or switches.
Figure 2:
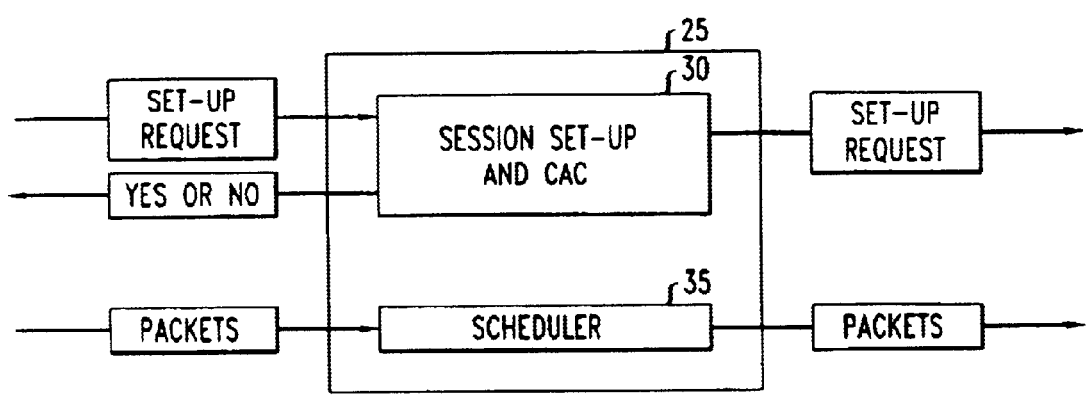
FIG. 2 is a simplified schematic diagram illustrating certain functions of a server.

FIG. 2 schematically depicts some of the functions of server 25. Block 30 receives session set-up requests, performs CAC, and returns confirmation whether or not the set-up request will be honored. If the request is honored, the set-up request is passed to the next server downstream. If the set-up request is honored at every server along the requested path from source to destination, set-up operations are performed. Block 35 receives incoming packets, schedules them for processing, and as processing goes forward, sends outgoing packets to the next server downstream. If block 35 resides in the last server, it sends the processed packets to their destination.

Each set-up request for a new session includes descriptive information that characterizes the session. Such information typically includes, for the i'th session, a mean traffic arrival rate $\rho_i$ (in, e.g., bits per second), a peak traffic arrival rate $r_i$, a burst size $\sigma_i$, a maximum packet size $L_i$, a delay bound $T_i$, and a maximum permissible violation probability $\delta_i$. The QoS requirement on delay is that the probability that any packet of the offered session will be delayed by more than $T_i$ can be no more than $\delta_i$; i.e., that Pr[Delay of Packet p>$T_i$]≤$\delta_i$.

Significantly, information of the kind enumerated above can be stored for each of multiple classes of traffic. If such stored information is available, it is sufficient for the incoming request to provide the value of an index that identifies the pertinent class. Application of the method to be described below also requires certain assumptions about the form of the statistical distribution of packet arrival times and packet sizes in the offered session. One generally applicable distribution, such as Poisson arrivals, can be assumed for all classes of traffic. Alternatively, and more advantageously, a particular distribution can be associated with each class. Identification of, or a description of, that distribution can be included with the stored information describing the pertinent class.

Figure 3:
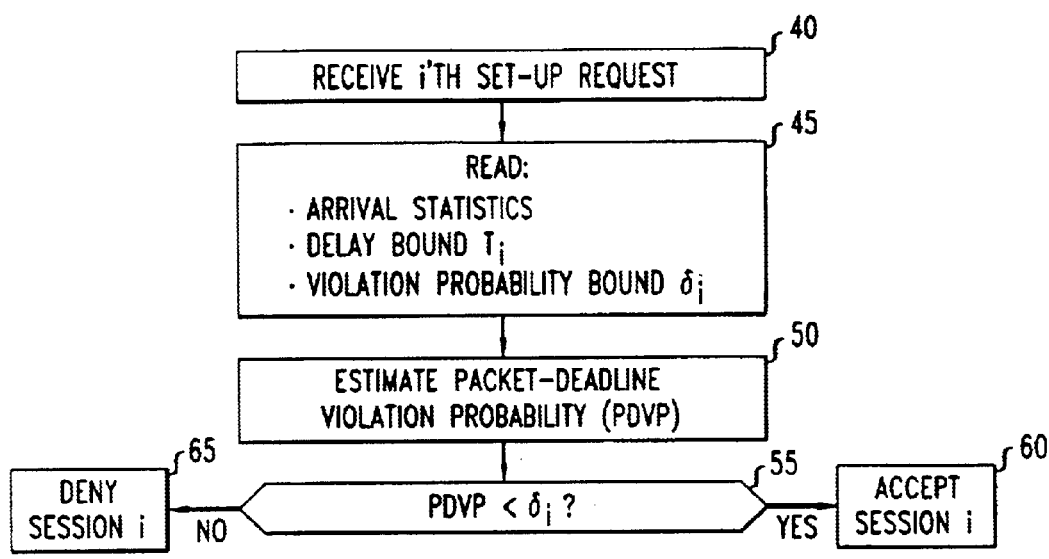
FIG. 3 is a flowchart of an admission-control procedure according to one embodiment of the invention.

FIG. 3 shows an exemplary admission-control procedure according to one embodiment of the invention. At block 40, a set-up request is received for session i. At block 45, a description of packet arrival statistics, and the delay bound and maximum permissible violation probability are read. At block 50, a calculation is performed to estimate the packet-deadline violation probability (PDVP) in view of the given information and a statistical model, either provided or assumed, of the packet-arrival process. An exemplary such calculation is described below. At block 55, the PDVP is compared with the maximum permissible violation probability $\delta_i$. If the PDVP does not exceed $\delta_i$, the offered session is deemed admissible, as indicated at block 60. Otherwise, the offered session is denied, as indicated at block 65.

As noted above, the set-up request is not necessarily required to include an explicit set of descriptive information. Instead, the set-up request can provide the value of an index that identifies the class to which the offered session belongs. Descriptive information can then be obtained from a stored database.

If the statistical properties of the various classes of traffic are known in advance, it is possible through off-line calculations to construct a state diagram that will serve as a useful tool for determining whether a given offered session is admissible. Such a state diagram occupies a mathematical space having as many Cartesian coordinate axes as there are classes of traffic. Each "state" of the server is representable as an ordered n-tuple, each entry of which represents the number of sessions of a corresponding class that are currently in progress.

Figure 4:
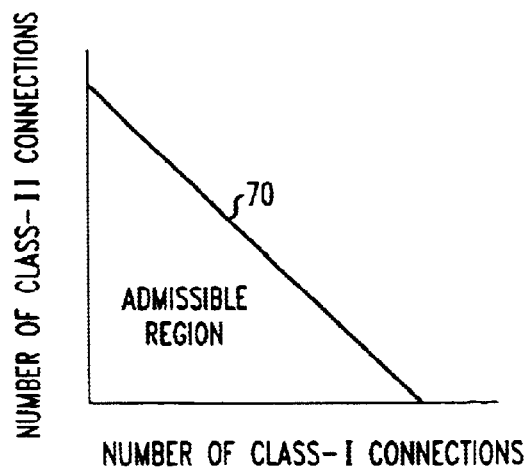
FIG. 4 is a state diagram for an illustrative server supporting traffic in two classes.

For example, FIG. 4 is a state diagram for an illustrative server supporting traffic in only two classes: Class I (horizontal axis) and Class II (vertical axis). Each state is represented in FIG. 4 by a discrete point whose horizontal position indicates an integral number of Class-I sessions (the "Class-I population"), and whose vertical position indicates an integral number of Class-II sessions (the "Class-II population"). Boundary 70 of the figure demarcates the admissible region, which is bounded by boundary 70 and the coordinate axes. States whose representational points lie on the side of the boundary proximate the origin of coordinates are admissible, and states whose representational points lie on the side distal the origin are not admissible.

A linear boundary of the kind depicted in the two-dimensional state diagram of FIG. 4 is readily generalized to a planar boundary in three dimensions, and to a boundary that is a hyperplane in four or more dimensions. Such a boundary is encountered, for example, in some of those prior-art approaches to CAC that assume that all packet arrivals in each class c would occur only at the peak rate r(c). Under such an assumption, the total rate of packet arrivals in each class would be the product of the pertinent class population $N_C$ times the pertinent peak rate. Thus, the total arrival rate would be the sum of these products over all classes. According to a simplified analysis, the admissible region would consist of all state points for which this sum is less than or equal to the total processing rate C of the server. That is, the admissibility condition under such a simplified analysis would be.

$$\sum_{All\ classes\ c} N_c r(c) \leq C.$$

The boundary of such a region is a line, plane, or hyperplane as described above.

A more detailed worst-case analysis may be found, e.g., in J. Liebeherr et al., "Exact admission control for networks with a bounded delay service," *IEEE Transactions on Networking* 4 (December 1996). The results of that more detailed analysis are conveniently described in terms of a function $A_i^*(x)$ that represents the maximum amount of session-i traffic that can arrive in a time interval of length x. Stated differently, $A_i^*(x)$ is the amount of session-i traffic that would arrive by time x if a burst began at time 0. If the delay bounds $T_i$ for the respective sessions are ordered such that $T_1 \leq T_2 \leq \ldots$, then under the worst-case analysis of Liebeherr et al., a set of sessions is admissible if and only it, for all times t no earlier than $T_1$, the following inequality is satisfied:

$$Ct \geq \sum_j A_j^*(t - T_j),$$

wherein the summation is taken over all sessions j. The admissible region according to such an analysis will generally be somewhat larger than the region bounded by the surface $$\sum_{All\ classes\ c} N_c r(c) \leq C.$$

Significantly, when principles of statistical multiplexing are applied, as in the present invention, the resulting admissible region is larger than the worst-case admissible region (according to any analysis) and in fact contains it as a subset. Thus, any point that is admissible according to a worst-case state diagram is also admissible according to a state diagram constructed according to the present invention. Moreover, a state diagram constructed according to the present invention will contain additional admissible points that lie outside the worst-case admissible region.

In practice, a state diagram will be embodied in a data structure within the memory of a computer or other data processing device. Although graphical representations of state diagrams, such as FIG. 4, are useful as a pedagogical device, it should be noted that the principles embodied in the state diagrams are readily employed without graphical representation.

Figure 5:
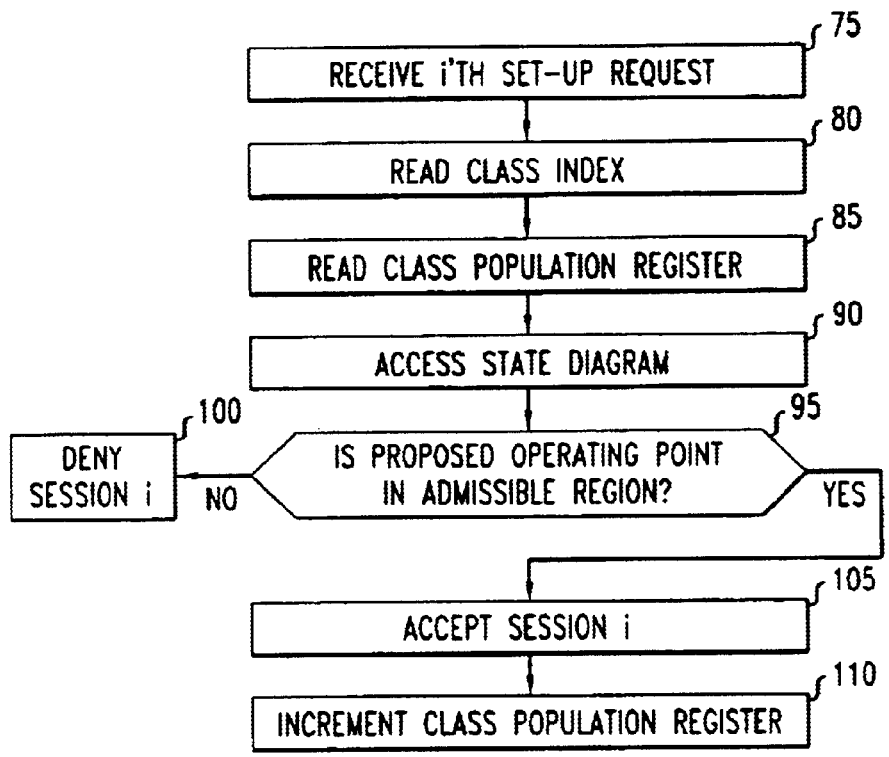
FIG. 5 is a flowchart of an admission-control procedure according to an alternate embodiment of the invention.

FIG. 5 shows an exemplary admission-control procedure according to an alternate embodiment of the invention. At block 75, a set-up request is received for session i. At block 80, the server reads an index identifying the class to which the requested session belongs. At block 85, the current population of each class is read from a class-population register. At block 90, the server accesses its state diagram. The proposed operating point for the server is the state derived from the current state by adding a unit increment to the population of the class corresponding to the current request. At block 95, a determination is made whether the proposed operating point lies within the admissible region. If it does not, the session is denied, as indicated at block 100. However, if the proposed operating point does lie within the admissible region, the session is deemed admissible. Additionally, if the session has been accepted by every server along its path, the session is admitted to the network and the pertinent class population register is incremented by one unit, as indicated at block 110.

Figure 6:
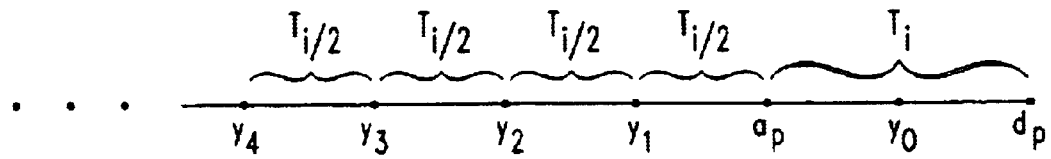
FIG. 6 is a timeline useful as a pedagogical aide in understanding a procedure for estimating violation probabilities in accordance with the invention.

An exemplary procedure for estimating the violation probability will now be described with reference to FIG. 6. A timeline is constructed as illustrated in the figure. It should be noted that although the graphical representation of FIG. 6 is useful for pedagogical purposes, the actual implementation of the procedure to be described will take place computationally, without the need for a graphical representation.

In the timeline as shown in the figure, time increases from left to right. A sequence of points $y_0, y_1, \ldots$, is defined, extending to earlier times as the index subscript is increased. The initial point $y_0$ may be situated anywhere on the closed interval from an arrival time $a_p$ of a packet p to the deadline $d_p$ of packet p. The deadline of any packet is its arrival time plus the delay bound $T_i$ of the corresponding session i. Although $y_0$ is shown in the figure as falling intermediate the arrival time and the deadline, $y_0$ may exemplarily be placed precisely at the packet arrival time $a_p$. The succeeding points $y_n$ may be placed at any intervals, provided they do not form a converging sequence. Exemplarily, as shown in the figure, $y_1$ is placed at a timepoint earlier than $a_p$ by $T_i/2$, and each succeeding $y_n$ is placed at a timepoint earlier than its predecessor by $T_i/2$. Although the sequence of points $y_n$ is infinite in principle, it will be generally be possible to truncate it to fewer than 50 points without introducing significant inaccuracy. The sequence as described here is herein denominated $Y(a_p, d_p)$.

I have mathematically proven that under a set of assumptions that are widely applicable to EDF servers, the probability that a given packet p of session i will violate its deadline has an upper bound that it can never exceed. That upper bound provides a useful estimate for the PDVP. For estimating the PDVP, the upper bound may be computed exactly or else it may itself be estimated using an appropriate approximation procedure. The pertinent assumptions are that: (i) the packet arrivals into each session are statistically independent; and (ii) each session only makes up a small fraction (e.g., less than 1%) of the load at each server.

Given a packet p having arrival time $a_p$ and deadline $d_p$, and given a sequence $Y(a_p, d_p)$, the upper bound on the packet violation probability is: the probability that for any timepoint $y_n$ of the sequence $Y(a_p, d_p)$, n>0, the cumulative volume of the packets arriving between $y_n$ and $a_p$ will exceed the total packet volume that the server can process between the next-in-time timepoint $Y_{n-1}$ and the packet deadline $d_p$. Mathematically, this probability is stated as:

$$\sum_{n=1}^{\infty} Pr\left[\sum_i A_i(y_n, d_p - T_i) \geq C(d_p - y_{n-1})\right]. \quad \text{(Eq. 1)}$$

In the preceding expression, $A_i$ $(y_n, d_p - T_i)$ represents the cumulative volume, e.g. in bits, of the packets arriving between $y_n$ and $a_p$, i.e., between $y_n$ and $d_p - T_i$. The outer summation is carried out over the indices n of the points of the sequence $Y(a_p, d_p)$. The inner summation is carried out over the indices i of all sessions currently being served, plus the newly offered session.

The probability stated by the above formula can be calculated by standard methods, given an appropriate statistical model for the packet-arrival process. In particular, an upper-bound approximation of the kind known as a Chernoff bound is readily applied to simplify the calculation.

By the Chernoff-bound approximation, $$-\ln Pr\left[\sum_i A_i(y_n, d_p - T) \geq C(d_p - y_{n-1})\right] \geq \quad \text{(Eq. 2)}$$

$$sC(d_p - y_{n-1}) - \sum_i \ln E[e^{sA_i(y_n, d_p - T)}],$$

where s is a freely running parameter that can take on any non-negative value, and E[ . . . ] denotes the expected value, evaluated using standard methods of statistical computation. The value of the parameter s that yields the best bound is readily determined from, e.g., a one-dimensional optimization. From the right-hand side of the inequality in Eq. 2, an expression is readily derived that can be substituted for each of the individual probabilities in the outer summation of Eq. 1.

Up to this point, I have discussed the admission decision when the entire delay bound $T_i$ applies only to a single hop originating at the server of interest. More generally, however, $T_i$ represents a cumulative delay budget over all hops of the designated path for the session. I have found that the same methodology described above can be applied at each server along the path, at least when: (i) the network is a so-called "drop network" that discards every packet that violates its deadline; and (ii) a modified interpretation, to be described below, is placed on the arrival time $a_p$ of packet p. Additionally, a particular method of partitioning the cumulative delay $T_i$, useful in this regard, is described below.

Figure 7:
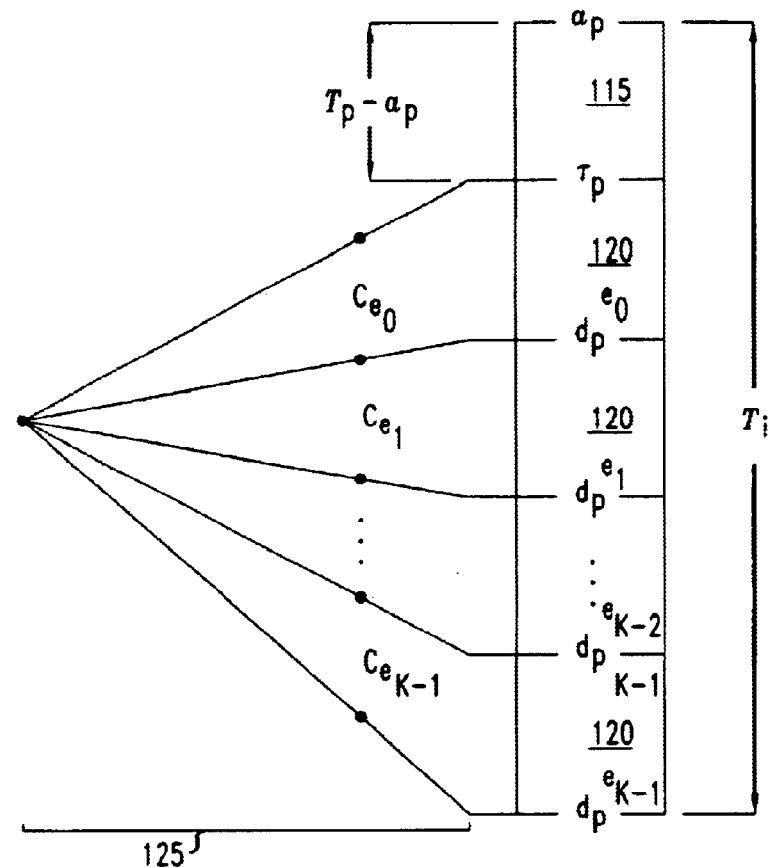
FIG. 7 is a geometrical construction useful as a pedagogical aide in understanding a procedure for allocating delay among multiple hops in accordance with the invention in certain embodiments.

The preferred partition will now be described with reference to FIG. 7. A timepoint $\tau_p$, later than $a_p$ but earlier than $a_p+T_i$, is selected. The first $\tau_p-a_p$ units of delay, represented in the figure by block 115, are assigned to the first hop on the path of packet p. The remaining delay is divided among the hops, including the first hop, in proportion to server speed. Let the servers be designated $e_0, e_1, \ldots, e_{K-1}$, let the deadline of the j'th server (i.e., the server from which the j'th hop originates) for packet p be designated $d_p^{e_j}$, and let the processing rate of the j'th server be designated $C_{e_j}$. Then the partition is described by:

$$d_p^{e_0} = \tau_p + \frac{(T_i - \tau_p + a_p)C_{e_0}}{\sum_{k=0}^{K-1} C_{e_k}}, \quad \text{(Eq. 3)}$$

$$d_p^{e_j} = d_p^{e_{j-1}} + \frac{(T_i - \tau_p + a_p)C_{e_j}}{\sum_{k=0}^{K-1} C_{e_k}} \text{ for } j > 0.$$

Accordingly, each of the allocations of delay denoted in the figure by reference numeral 120 is proportional to a respective server processing rate, as indicated in the figure by projection 125.

The modification, referred to above, of packet arrival time $a_p^{e_k}$ at the k'th server is achieved by replacing the packet-arrival time by a pseudo-arrival time $â_p^{e_k}$ that is set equal to the packet's deadline $d_p^{e_{k-1}}$ for the previous server. The packet's pseudo-arrival time at the first server $e_0$ is set equal to $\tau_p$.

Significantly, the parameter $\tau_p$ affords a useful way to emulate the behavior of a flow regulator, and thus to improve the acceptance rate of offered sessions when the traffic arriving at the first server is bursty. That is, the leeway granted by the extra delay $\tau_p-a_p$ at the first hop can smooth the session-i traffic at the first hop. This can lead to reduced violation probabilities at subsequent hops. For this purpose, it is useful to set $\tau_p$ to the time that packet p would arrive at its first server if session i passed through a (B,f) rate controller for some parameters B,f. A (B,f) rate controller is a device that controls traffic so that the total traffic that departs from it during the time interval [s, t] is at most B+f(t–s).

However, it should be noted that no actual rate controller is used. Instead, packet p will be eligible for service at its arrival time $a_p$. The emulation of a rate controller is simply a tool used to define the packet deadlines in an advantageous manner.

When the total delay budget is allocated over multiple hops, the j'th server performs the same analysis as in the single-hop case, except: (i) it assumes that packet p will arrive at its pseudo-arrival time $â_p^{e_j}$; and (ii) it assigns packet p a delay bound equal to $d_p^{e_j}-d_p^{e_{j-1}}$.

It should be noted that in our analyses of network behavior, we have assumed that the service at a server is preemptive, that is, that a server can serve more than one packet simultaneously, and that it can transfer service from one packet to another before the first packet is fully served. Preemptivity is a useful assumption because it simplifies the analysis. In practice, this assumption is not critical, since the preemptive schemes considered here are readily converted to non-preemptive schemes wherein each packet suffers an additional delay of at most $L_{max}/C_e$ at each hop, where $L_{max}$ is the greatest packet size over all sessions. For high-speed networks, this additional delay is negligible. A useful reference in this regard is L. Georgiadis et al., "Optimal multiplexing on a single link: Delay and buffer requirements," *IEEE Transactions on Information Theory* 43 (1997).

EXAMPLE

I performed a series of numerical simulations to compare the performance of an EDF server, implementing CAC according to the present invention, to the performance of a GPS server implementing statistical multiplexing techniques through the imposition of an effective bandwidth for each session.

Initially, only a single class of traffic was considered. Packet arrivals into each session were modeled by a periodic on-off process of period 10 s and on-period 1 s. During the on-period, a packet of size 10 kb was injected once per interval of size 100 ms. Thus, the peak rate was 100 kbps and the mean rate was 10 kbps. The processing rate of each server was 100 Mbps. Hence, the maximum number of sessions for which the server was stable was 10,000. All sessions had the same delay bound T.

The time-discretizing sequence was defined by $y_0=d_p-T$;

$$y_n = y_{n-1} - \frac{T}{2}.$$

Figure 8:
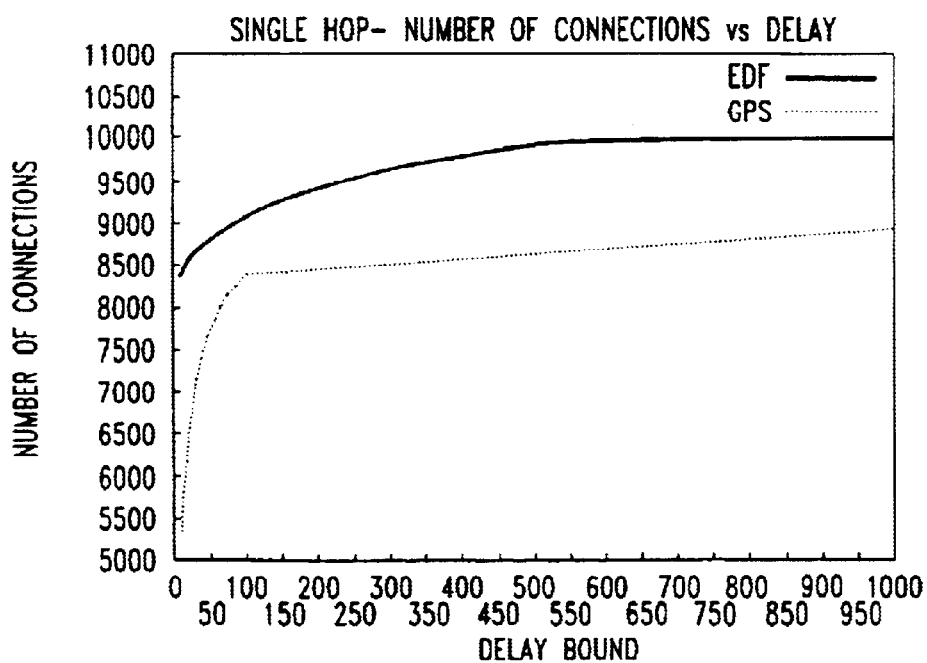
FIG. 8 is a performance curve, from numerical simulations, comparing EDF, including methods of the present invention, to GPS. Plotted in the figure is the maximum number of connections that can be supported, for a fixed value of the violation probability, versus the delay bound T. Only a single hop is considered.

FIG. 8 is a graph of the maximum number of connections that can be supported, for a fixed value of the violation probability, versus the delay bound T. The violation probability is fixed at $e^{-16}$. Only a single hop is considered. It is evident from the figure that for each value of the delay, more connections can be supported using the EDF discipline than can be supported using GPS.

Figure 9:
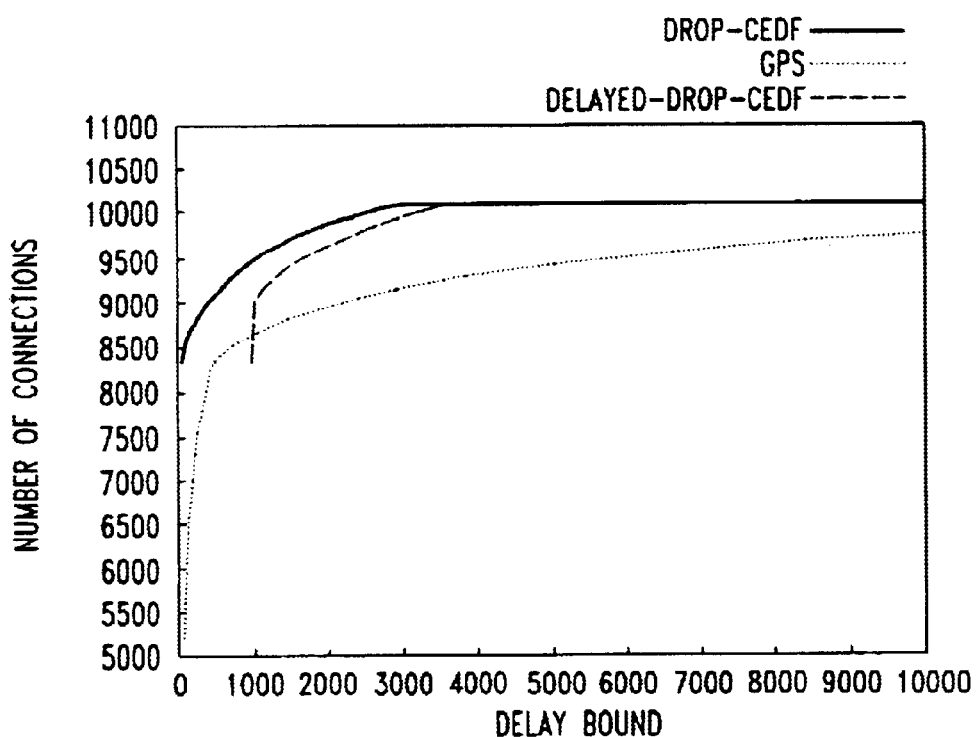
FIG. 9 is a performance curve, from numerical simulations, comparing EDF, including methods of the present invention, to GPS. Plotted in the figure is the maximum number of connections that can be supported, versus delay, for five-hop sessions.

FIG. 9 is a graph of the maximum number of connections that can be supported, versus delay, for five-hop sessions. The same assumptions are made as for FIG. 8. The delay bound is end-to-end. Delay is allocated among the hops as described above. Such an allocation scheme is here referred to as Coordinated EDF (CEDF). Two curves are shown for the CEDF discipline. For both curves, the network is assumed to drop any packet that does not meet its deadline. Thus, both curves are labeled as representing "drop-CEDF." However, the two curves differ in the assignment of the initial timepoint $\tau_p$. For the curve simply labeled "drop-CEDF," $\tau_p$ is the packet arrival time. For the curve labeled "delayed-drop-CEDF," $\tau_p$ is the time that the packet would leave a (10 kb, 50 kbps) rate controller.

Figure 10:
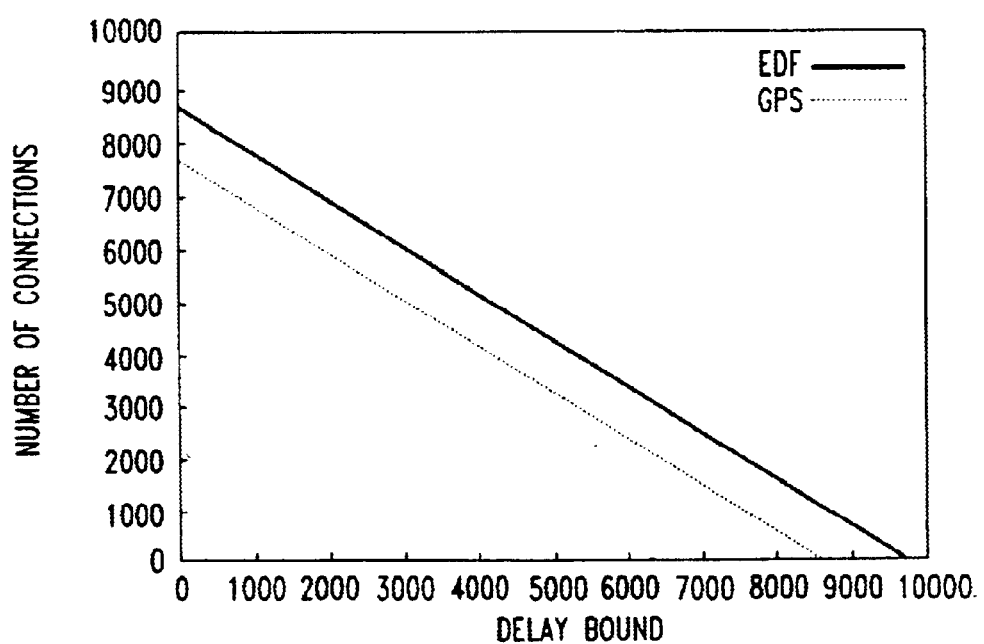
FIG. 10 is a performance curve, from numerical simulations, comparing EDF, including methods of the present invention, to GPS. Graphed in the figure is the admissible region for a single server and two classes of sessions.

FIG. 10 is a graph of the admissible region for a single server and two classes of sessions. The same assumptions are made as above, except that Class 1 has a delay bound of 200 ms and Class 2 has a delay bound of 50 ms. The required violation probability for each class is $e^{-16}$. For the EDF curve, the time-discretizing sequence for all packets was defined by $y_0 = d_p - T_2$;

$$y_n = y_{n-1} - \frac{T_2}{2}.$$

Plotted in the figure is the boundary of the admissible region given by the estimates of violation probability for EDF and GPS. The admissible region consisted of those pairs $(N_1, N_2)$ such that $N_1$ Class-1 sessions and $N_2$ Class-2 sessions can all meet their delay bounds with the required violation probability.

What is claimed is:

1. A method of connection admission control for a server of a packetized communication network, the server having a total rate for the processing of packets, the method comprising:
   (a) defining an operating point that represents, for each of a plurality of classes c, a count $N_c$ of how many sessions of class c are currently being served, each count $N_c$ further including any currently offered session of class c; and
   (b) determining whether the defined operating point falls within an admissible region of a space of possible operating points, wherein each class c has a peak traffic rate r(c), and the admissible region includes at least one point for which at least some packets would be denied admission if all sessions were to simultaneously start sending bursts of packets at their respective maximum arrival rates; wherein:
      each packet has a probability, denominated the violation probability, of being delayed by more than a specified delay bound, and the admissible region is selected to assure that no packet processed by the server will have a violation probability greater than a specified limit; and
      the violation probabilities are computed taking into account that the server is configured for EDF scheduling of admitted packets.

2. The method of claim 1, wherein the admissible region has the property that for each session, the violation probability is calculated, in part, by comparing a pattern of packet arrivals to a processing capacity of the server.

3. The method of claim 2, wherein:
   the pattern of packet arrivals is defined relative to a sequence of discrete timepoints whose last timepoint is an effective packet arrival time a or a time subsequent thereto by an increment of one delay bound or less; and
   the violation probability is estimated as the probability that for any timepoint y of the sequence except the last such timepoint, the cumulative volume of packets arriving between y and a will exceed the total packet volume that the server can process between: (i) the timepoint, belonging to the sequence, that next follows y in time, and (ii) the timepoint a+T.

4. The method of claim 1, wherein:
   said server is the first server along a route for an offered session that includes at least one further server;
   a bound is specified for the total delay of packets of the session as accrued over all servers included in the route; and
   the method further comprises specifying an individual delay bound for each server included in the route.

5. The method claim 4, wherein the delay bounds for the individual servers are specified by partitioning the total delay bound such that the individual delay bounds sum to the total delay bound.

6. The method of claim 5, wherein:
   the total delay bound is partitioned into a first part and a second part;
   the second part is allocated to the delay bounds of the individual servers in proportion to the respective total packet-processing rates of the individual servers;
   the assigned delay bound for the first server is the sum of: (i) the first part of the total delay bound, and (ii) that portion of the second part of the total delay bound that is allocated to the first server; and
   the assigned delay bound for each further server is that portion of said second part that is allocated to such further server.

7. The method of claim 5, wherein:
   the admissible region of each server has the property that for each session, the violation probability is calculated, in part, by comparing a pattern of packet arrivals to a processing capacity of the server;
   the pattern of packet arrivals is defined relative to a sequence of discrete timepoints whose last timepoint is an effective packet arrival time a or a time subsequent thereto by an increment of one delay bound or less;
   the violation probability is estimated as the probability that for any timepoint y of the sequence except the last such timepoint, the cumulative volume of packets arriving between y and a will exceed the total packet volume that the server can process between: (i) the timepoint, belonging to the sequence, that next follows y in time, and (ii) the timepoint a+T;
   for the purpose of estimating violation probability, the effective arrival time of a packet at the first server is its actual arrival time;
   for said purpose, the effective arrival time of a packet at each further server is a pseudo-arrival time; and
   each pseudo-arrival time is equal to the sum of: (i) the effective packet arrival time at the previous server, and (ii) the delay bound specified for the previous server.

8. The method of claim 1, wherein the step of determining whether the defined operating point falls within an admissible region comprises locating the defined operating point in a stored representation of the space of possible operating points.

9. The method of claim 1, wherein:
   the step of determining whether the defined operating point falls within an admissible region comprises carrying out a computation to determine whether packets of a currently offered session will have a violation probability greater than a specified limit.

10. The method of claim 9, wherein the admissible region has the property that for each session, the computation is carried out, in part, by comparing a pattern of packet arrivals to a processing capacity of the server.

* * * * *